July 31, 1951 — A. ZUKOR — 2,562,758
AUXILIARY NONSKID WHEEL FOR MOTOR VEHICLES
Filed April 1, 1949 — 2 Sheets-Sheet 1

INVENTOR.
ARNOLD ZUKOR
BY
ATTORNEY

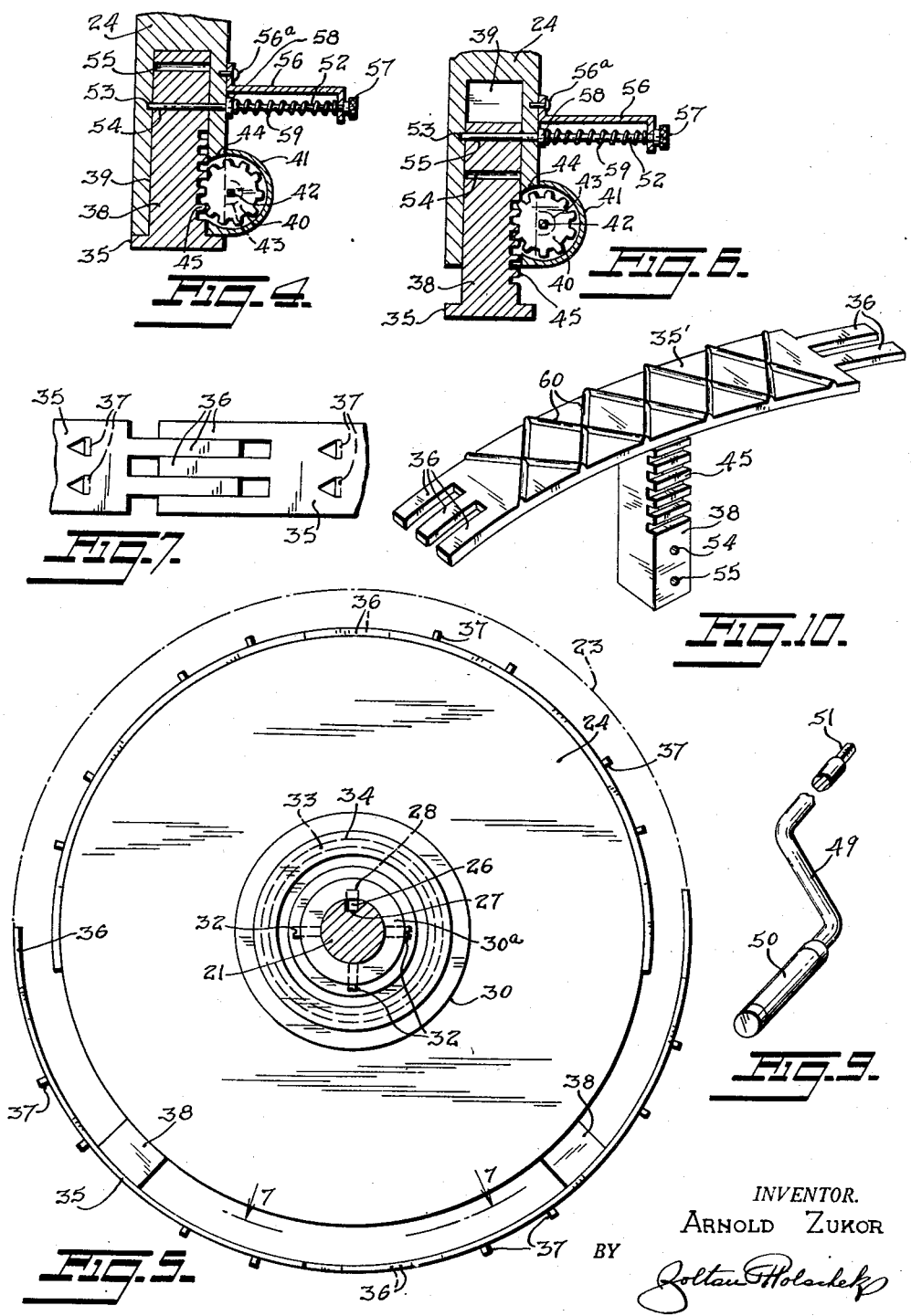

Patented July 31, 1951

2,562,758

UNITED STATES PATENT OFFICE 2,562,758

AUXILIARY NONSKID WHEEL FOR MOTOR VEHICLES

Arnold Zukor, New York, N. Y.

Application April 1, 1949, Serial No. 84,822

5 Claims. (Cl. 180—15)

This invention relates to new and useful improvements in an auxiliary non-skid wheel for motor vehicles.

More particularly, the present invention proposes the construction of an auxiliary non-skid wheel for a motor vehicle which is normally inoperative but which may be moved to an operative position to provide additional traction for getting a stalled motor vehicle out of a snow bank, mud or other soft ground surfaces.

Another object of the present invention proposes characterizing the auxiliary non-skid wheel by an auxiliary wheel body mounted on the axle along one side of both of the rear wheels and which has a diameter smaller than the rear wheel so that the auxiliary wheel body will be out of contact with the ground surface.

A further object of the present invention proposes keying the auxiliary wheel body to the vehicle axle to rotate therewith and to provide means for supporting the auxiliary wheel body in a manner to reduce wobbly rotation thereof.

Still another object of the present invention proposes providing the auxiliary wheel body with tread segments which are normally in contact with the periphery of the wheel body and which are provided with traction elements on their exposed faces which are normally out of contact with the ground surface.

The present invention further proposes mounting the tread segments on stems which are slidably mounted within radially extending holes formed in the auxiliary wheel body and which are acted upon by manually controllable means for extending the stems in a manner to move the tread segments into contact with the ground surface.

A still further object of the present invention proposes the provision of a manually controllable latch means which operates on the stems in a manner to retain the stems in a position in which the tread segments are retained inoperatively against the periphery of the auxiliary wheel body or in which the tread segments are operatively extended from the periphery of the auxiliary wheel body.

It is a further object of the present invention to provide an auxiliary non-skid wheel for a motor vehicle which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a sectional view taken on the line 4—4 of Fig. 2.

Fig. 5 is a view similar to Fig. 2, but looking at the other side of the auxiliary wheel and with two of the tread segments extended to their operative positions.

Fig. 6 is a view similar to Fig. 4, but illustrating the position of the parts when the tread segments are in their operative extended positions.

Fig. 7 is a plan view of the interengaged ends of two adjacent tread segments looking in the direction of the line 7—7 of Fig. 5.

Fig. 9 is a perspective view of the hand tool to be used to move the tread segments between their operative and inoperative positions.

Fig. 10 is a bottom perspective view of a tread segment constructed in accordance with a modification of the present invention.

Figure 1:
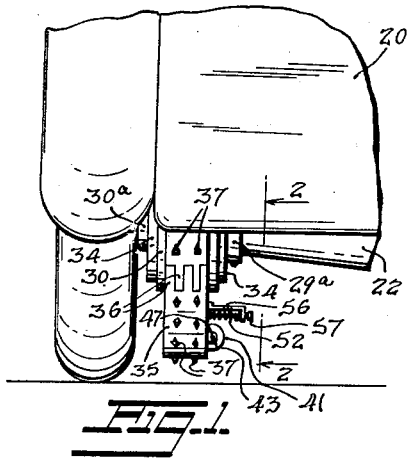
Fig. 1 is a partial rear elevational view of a motor vehicle provided with an auxiliary non-skid wheel for motor vehicles constructed in accordance with the present invention.

The auxiliary non-skid wheel for motor vehicles, according to the present invention, is shown applied to a motor vehicle 20 and is preferably used only in connection with the driven rear wheels of the vehicle. The vehicle 20 has an axle 21 enclosed within the usual axle housing 22. The axle 21 has an end projected beyond the end of the axle housing 22 and the usual driven wheel 23 is mounted on that projected end of the axle 21.

The auxiliary non-skid wheel is mounted on the axle 21 inward of the driven wheel 23 and includes an auxiliary wheel body 24 in the form of a circular disc having a diameter less than that of the driven wheel 23, so that the periphery of the wheel body 24 will be out of contact with the ground.

Figure 3:
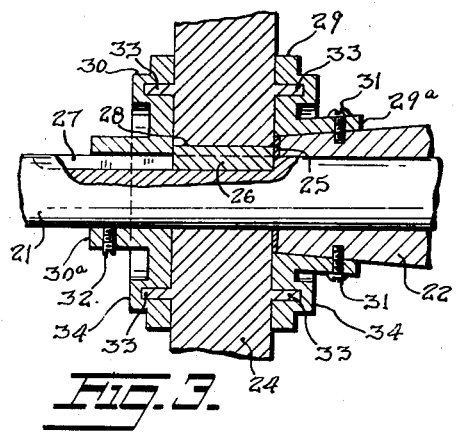
Fig. 3 is a sectional view taken on the line 3—3 of Fig. 2.
Figure 8:
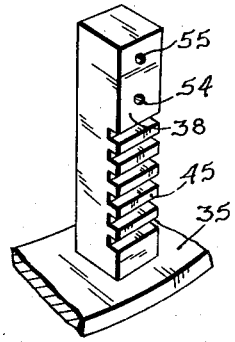
Fig. 8 is a partial perspective view of one of the tread segments, per se.

The wheel body is positioned on the axle 21 adjacent the end of the axle housing 22 with a washer 25, see Fig. 3, interposed therebetween. The wheel body 24 is locked to the axle 21 to rotate therewith by a key 26 having a portion engaging a keyway 27 formed in the axle 21 and having a portion engaging a complementary keyway 28 formed in the wheel body 24.

Means is provided for steadying the rotations of the wheel body 24 with the axle 21 so as to reduce wobbling thereof. This means is characterized by small metallic discs 29 and 30 which are disposed in facial contact with the opposed sides of the wheel body 24. The disc 29 has a laterally extending circular flange 29a which surrounds the end of the axle housing 22 and which is secured thereto by means of screws 31. The disc 30 also has a circular flange 30a which surrounds the projected end of the axle 21 and which is adjustably secured thereto by set screws 32. The disc 30 also engages the end of the key 26, see Fig. 3, and retains the same in position in the keyways 27 and 28. The set screws 32 permit adjustment of the discs 29 and 30 with relation to each other to space them properly so that the wheel body 24 may freely rotate therebetween.

The opposed faces of the wheel body 24 are formed, within the diameter of the discs 29 and 30, with laterally extending circular flanges 33 which engage complementary circular grooves 34 formed in the discs 29 and 30. The interengagement of the flanges 33 and the grooves 34 function to support the wheel body 24 against wobbly rotation.

Extended about the periphery of the wheel body 24 there is a plurality of tread segments 35 formed of rigid metallic material and arranged in end alignment. The adjacent ends of the tread segments 35 have tongue portions 36, see Figs. 1 and 7, which interengage each other to steady the tread segments against lateral displacement when the segments are in end alignment. Stamped from the material of the tread segments 35 there are a plurality of traction elements 37 for engaging and gripping the ground surface when the tread segments are in their operative extended position.

Stems 38 project inward from each of the tread segments 35 intermediate of their ends and are slidably received in holes 39 formed in the wheel body 24. There is one hole 39 for each of the stems 38 and the holes are extended radially inward from the periphery of the wheel body 24 for guiding movements of the tread segments 35 between operative and inoperative positions and vice versa.

Figure 2:
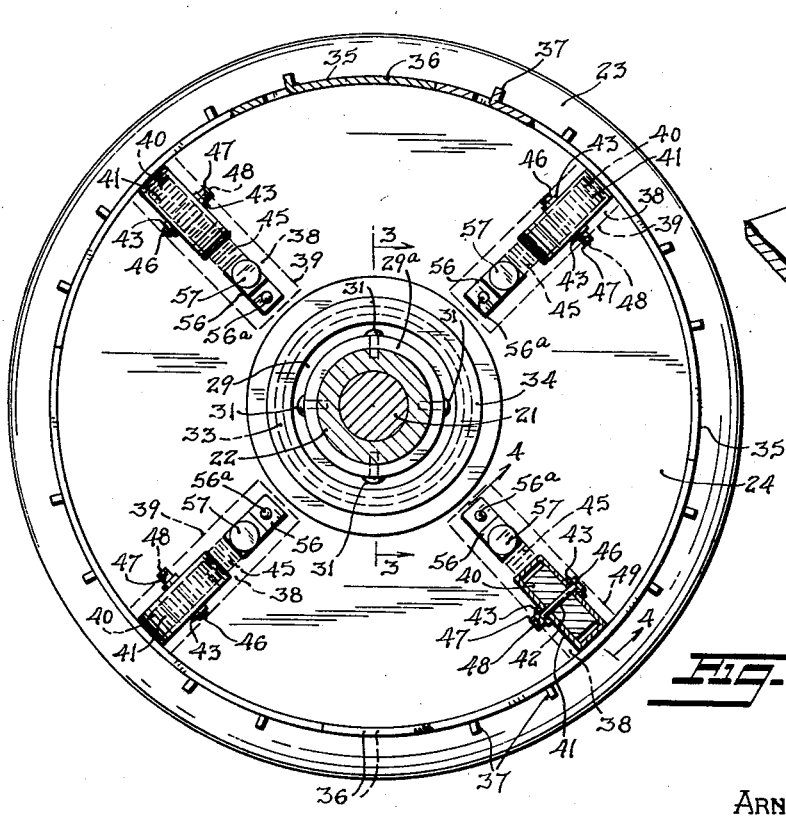
Fig. 2 is an enlarged sectional view taken on the line 2—2 of Fig. 1 with parts of the auxiliary wheel broken away.

Means is provided for moving the stems 38 to positions extended from the outer ends of the holes 39 for moving the tread segments 35 from their inoperative positions in contact with the periphery of the wheel body 24, as shown in Fig. 2, to their operative positions extended from the periphery of the wheel body 24, as shown at the bottom of Fig. 5, to engage the ground surface. This moving means is characterized by a gear 40 for each of the stems 38 which is partially received within a semi-circular housing 41. A pin 42 is passed through the gear 40 and the housing 41 and has its ends rotatively supported in bosses 43 formed on the side of the wheel body 24 and between which the gear 40 and the housing 41 are received. The pin 42 has a non-circular intermediate portion, see Figs. 4 and 6, matched by a complementary non-circular passage in the gear 40 for locking the gear to the pin to be rotated when the pin is rotated relative to the housing 41 and the bosses 43.

The sides of the gears 40 adjacent the wheel body 24 are projected through openings 44 formed in the side of the wheel body 24 to mesh with rack teeth 45 formed partially along the adjacent side of the respective stems 38. One end of each of the pins 42 is formed with a head 46 and the other end is formed with a socket 47 having a non-circular opening 48. A tool 49 in the form of a crank, as shown in Fig. 9, is provided at one end with a handle 50 and at its other end with a non-circular end portion 51 which is to be successively engaged into each of the non-circular openings 48 of the sockets 47 for rotating the pins 42 to in turn rotate the gears 40 to extend or retract the stems 38 and similarly move the tread segments 35.

Means is also provided for locking the stems 38 in either their extended or retracted positions with relation to the wheel body 24. The locking means is comprised of a lock pin 52 for each of the stems 38, which has its inner end slidably received in aligned openings 53 formed in the wheel body 24 on opposite sides of the holes 39. The inner ends of the pins 52 are also selectively extendable through an outer passage 54 or an inner passage 55 formed in the stems 38. When the pin 52 is extended through the outer passage 54 of the respective stem 38, as shown in Fig. 4, that stem and the respective tread segment 35 will be in their inoperative retracted position as shown in full lines in Fig. 4. However, when the pin 52 is extended through the inner passage 55 of the respective stem 38, as shown in Fig. 6, that stem and the respective tread segment 35 will be in their operative extended position as shown in dot and dash lines in Fig. 4 and in full lines in Fig. 6.

The outer ends of the pins 52 are slidably extended through brackets 56 and are provided with knobs 57 by which a grip may be had on the ends of the pins 52 to pull outward thereon to retract the inner ends of the pins 52 from either the passages 54 or the passages 55 to free the stems 38 for movement in the desired direction. The brackets 56 are secured to the side of the wheel body 24 by means of pins 56a.

Fixedly mounted on the pins 52, there are collars 58 and springs 59 concentrically wound on the pins 52 and operate between the collars 58 and the adjacent portions of the brackets 56 for retaining the pins 52 in their normal operative positions shown in Figs. 4 and 6.

The operation of the auxiliary non-skid wheel is as follows:

Normally, the tread segments 35 are in their retracted position as shown in Figs. 1 and 2 and the wheel body 24 rotates with the axle 21 behind the driven wheel 23. In the event the driven wheel becomes stuck in the mud, snow or other soft ground, the operator jacks up each of the driven wheels independently and releases his brake so that the wheel body is free to be rotated. The wheel body 24 is then rotated so that one of the tread segments 35 will be directed downward and the respective stem 38 is extended vertically. The noncircular end portion 51 of the tool 49 is then engaged into the non-circular opening 48 of the respective socket 47 and the respective pin 52 is then pulled outward against the action of the respective spring 59 disengaging the pin from the outer passage 54. This frees the stem 38 to be extended by rotation of the tool 49 which in turn rotates the respective gear 40 to extend the stem 38 moving the tread segment 35 to its operative extended position, as shown in Fig. 6. As the stem approaches its fully extended position the inner end of the pin 52 and the inner passage 55 become aligned so that the spring 59 immediately snaps the pin 52 inward, to the position shown in Fig. 6, locking the stem 38 in its extended position. The wheel body 24 is then rotated through 90° bringing the next tread segment to a lowered position with its stem 38 extended vertically. The procedure is then repeated to move that tread segment to its operative position and is successively repeated for each of the remaining tread segments 35 of each of the auxiliary wheels. When the tread segments 35 are moved to operative extended positions the tongues 36 move out of engagement but as each successive segment 35 is moved to operative extended position the tongues reengage each other in a slightly extended position as shown in Fig. 7.

When all of the tread segments 35 are in their extended positions the car may be driven as usual and the tread segments with their projecting traction elements 37 will furnish the extra traction required to drive the vehicle out of the mud, snow or other soft ground. When the vehicle is again free the same is again jacked up and the above procedure is reversed for restoring the stems 38 and the tread segments 35 to their starting positions.

In the modified form of the tread segment 35' shown in Fig. 10, the construction differs from that previously described merely in the formation of the traction elements on the exposed faces of the tread segment. In this form of the invention, the traction elements comprises crisscrossed ribs 60 molded directly on the exposed faces of the tread segment 35'.

In other respects this modification of the tread segment is similar to that previously described and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In combination with a motor vehicle having an axle housing rotatively enclosing an axle having an end portion extended from the axle housing, an auxiliary wheel body of a diameter less than the diameter of the vehicle wheel mounted on the extended end portion of the axle to rotate therewith, means on the axle and the axle housing supporting said wheel body against wobbly rotation, tread segments engaged about the periphery of said wheel body, said wheel body being formed with radially extending holes opening to the periphery thereof and one for each of said tread segments, stems projecting from said tread segments and slidably projected into said holes, means for moving said stems to move said tread segments from inoperative positions in contact with the periphery of the wheel body to operative positions extended from the periphery of said wheel body, and means for locking said stems for holding said tread segments in either of their two positions, said supporting means comprising discs on the axle and axle housing and formed adjacent their peripheries with grooves opening toward the wheel body, and flanges projecting from the sides of said wheel body and engaging said grooves.

2. In combination with a motor vehicle having an axle housing rotatively enclosing an axle having an end portion extended from the axle housing, an auxiliary wheel body of a diameter less than the diameter of the vehicle wheel mounted on the extended end portion of the axle to rotate therewith, means on the axle and the axle housing supporting said wheel body against wobbly rotation, tread segments engaged about the periphery of said wheel body, said wheel body being formed with radially extending holes opening to the periphery thereof and one for each of said tread segments, stems projecting from said tread segments and slidably projected into said holes, means for moving said stems to move said tread segments from inoperative positions in contact with the periphery of the wheel body to operative positions extended from the periphery of said wheel body, and means for locking said stems for holding said tread segments in either of their two positions, said tread segments being formed at their adjacent ends with interengaged tongues which retain the segments against relative lateral movement.

3. In combination with a motor vehicle having an axle housing rotatively enclosing an axle having an end portion extended from the axle housing, an auxiliary wheel body of a diameter less than the diameter of the vehicle wheel mounted on the extended end portion of the axle to rotate therewith, means on the axle and the axle housing supporting said wheel body against wobbly rotation, tread segments engaged about the periphery of said wheel body, said wheel body being formed with radially extending holes opening to the periphery thereof and one for each of said tread segments, stems projecting from said tread segments and slidably projected into said holes, means for moving said stems to move said tread segments from inoperative positions in contact with the periphery of the wheel body to operative positions extended from the periphery of said wheel body, and means for locking said stems for holding said tread segments in either of their two positions, said tread segments being formed at their adjacent ends with interengaged tongues which retain the segments against relative lateral movement, said tongues being of a length to be completely engaged when said tread segments are in their inoperative positions and partially engaged when said tread segments are in their operative positions.

4. In combination with a motor vehicle having an axle housing rotatively enclosing an axle having an end portion extended from the axle housing and a vehicle wheel mounted on the extended end portion, an auxiliary wheel body mounted on the extended end portion of the axle between the axle housing and the vehicle wheel, said auxiliary wheel body being of a diameter less than that of the vehicle wheel and having tread segments arranged about and positioned inoperatively against the periphery of said auxiliary wheel body, means supporting said tread segments on said wheel body to be movable into operative positions spaced from the periphery of said auxiliary wheel body, discs positioned concentrically on opposite sides of said auxiliary wheel body, means fixedly mounting one of said discs on the end of said axle housing and in facial contact with the adjacent side of said auxiliary wheel body, means adjustably mounting the other of said discs on the axle and in facial contact with the adjacent side of said auxiliary wheel body, and means on the adjacent faces of said auxiliary wheel body and said discs for holding said auxiliary wheel body against wobbly rotation.

5. In combination with a motor vehicle having an axle housing rotatively enclosing an axle having an end portion extended from the axle housing and a vehicle wheel mounted on the extended end portion, an auxiliary wheel body mounted on the extended end portion of the axle between the axle housing and the vehicle wheel, said auxiliary wheel body being of a diameter less than that of the vehicle wheel and having tread segments arranged about and positioned inoperatively against the periphery of said auxiliary wheel body, means supporting said tread segments on said wheel body to be movable into operative positions spaced from the periphery of said auxiliary wheel body, discs positioned concentrically on opposite sides of said auxiliary wheel body, means fixedly mounting one of said discs on the end of said axle housing and in facial contact with the adjacent side of said auxiliary wheel body, means adjustably mounting the other of said discs on the axle and in facial contact with the adjacent side of said auxiliary wheel body, and means on the adjacent faces of said auxiliary wheel body and said discs for holding said auxiliary wheel body against wobbly rotation, said holding means comprising concentric flanges projecting from the opposed sides of said auxiliary wheel body and within the peripheries of said discs, said discs being formed with grooves opening toward the sides of said auxiliary wheel body and into which said flanges project.

ARNOLD ZUKOR.

REFERENCES CITED

The following references are of record in the file of this patent:

UNITED STATES PATENTS

| Number | Name | Date |
|---|---|---|
| 1,219,397 | Hershey | Mar. 13, 1917 |
| 1,816,300 | Stokes et al. | July 28, 1931 |
| 1,830,534 | Erwin | Nov. 3, 1931 |
| 2,079,501 | Gallagher et al. | May 4, 1937 |
| 2,231,203 | Strawn | Feb. 11, 1941 |

FOREIGN PATENTS

| Number | Country | Date |
|---|---|---|
| 1,612 | Great Britain | July 21, 1913 |